United States Patent [19]
Saur et al.

[11] Patent Number: 5,678,300
[45] Date of Patent: Oct. 21, 1997

[54] PROCESS FOR BRINGING THE ELECTRIC HEATING ELEMENT INTO A HOUSING

[75] Inventors: Roland Saur; Roland Pflieger, both of Stuttgart, Germany

[73] Assignee: Behr-Thomson Dehnstoffregler GmbH & Co., Kornwestheim, Germany

[21] Appl. No.: 587,946

[22] Filed: Jan. 17, 1996

[30] Foreign Application Priority Data

Jan. 17, 1995 [DE] Germany .................. 195 01 140.6

[51] Int. Cl.$^6$ .................. H05B 3/00; H05K 3/00
[52] U.S. Cl. .................. 29/611; 29/613; 29/619; 29/856; 264/272.18; 264/275; 264/272.15
[58] Field of Search .................. 29/611, 612, 613, 29/619, 855, 856; 219/541, 546; 264/272.15, 272.18, 275, 262

[56] References Cited

U.S. PATENT DOCUMENTS

| | | |
|---|---|---|
| 3,263,411 | 8/1966 | Carlson et al. . |
| 4,136,437 | 1/1979 | Leyrer .................. 29/613 |
| 4,243,968 | 1/1981 | Scott .................. 29/613 |
| 4,689,878 | 9/1987 | Beauregard et al. .................. 29/613 |

FOREIGN PATENT DOCUMENTS

| | | |
|---|---|---|
| 0 139 586 A1 | 5/1985 | European Pat. Off. . |
| 0 280 891 A1 | 9/1988 | European Pat. Off. . |
| 9105021 | 8/1991 | Germany . |
| 40 30 383A1 | 4/1992 | Germany . |
| 4233913A1 | 4/1994 | Germany . |
| 43 25 030A1 | 2/1995 | Germany . |
| WO90/04088 | 4/1990 | WIPO . |

OTHER PUBLICATIONS

German Office Action Sep. 7, 1995 Germany.

*Primary Examiner*—P. W. Echols
*Attorney, Agent, or Firm*—Evenson McKeown Edwards & Lenahan, PLLC

[57] ABSTRACT

In order to arrange an electric heating element in a housing of a thermostatic working element and to guide connecting lines to the outside in a sealing manner, a base made of plastic is injection molded into an opening of the bottom through which the connecting lines are guided to the outside.

5 Claims, 3 Drawing Sheets

PROCESS FOR BRINGING THE ELECTRIC HEATING ELEMENT INTO A HOUSING

BACKGROUND AND SUMMARY OF THE INVENTION

This invention relates to a thermostatic working element having a housing for receiving an expansion medium in which an electric heating element is arranged which is provided with connecting lines which are guided to the outside in a base which surrounds them and closes an opening of the bottom of the housing, and to a process for bringing an electric heating element into a housing.

In particular, such a thermostatic working element is used particularly with a thermostatic valve as it is known from German Patent Document DE 42 33 913 A1.

An electrically heated, thermostatic working element is known (European Patent Document EP 0 139 586 A1) in which an opening of the bottom of the housing is closed by means of a base made of plastic which surrounds the connecting lines of the heating element and through which the connecting lines are guided to the outside. The base is produced as a separate component. It is inserted from the outside into an opening of the housing having a ring shoulder with the interposition of a sealing ring and is held by means of a flanging of the outer edge of the opening.

It is an object of the invention to provide a construction which is as simple as possible and offers a high measure of tightness against an emerging of the expansion medium.

This object is achieved in that the base is injected molded into the opening of the bottom of the housing.

The mounting of an injected base has the advantage that the base is already mounted when it is manufactured without requiring any additional mounting operations for bringing in and adapting the base. In addition, such an injected base, in a simple manner, can be designed such that a very high measure of tightness is obtained.

According to certain preferred embodiments of the invention, it is provided that the base injected into the bottom projects to the outside by means of a projection surrounding the connecting lines. As a result, it is achieved that, on the one hand, the connecting lines are surrounded by the injected base along a relatively large length which leads to a high measure of tightness while, on the other hand, the connecting lines are held in a very secure manner so that the fastening points between the connecting lines and the heating element are relieved from tensile forces which are exercised on the connecting lines.

In a further development of preferred embodiments of the invention, it is provided that the injected-molded-on base frames an edge of the heating element which faces the bottom of the housing. As a result, the heating element is also held by the injected base and is fixed in the housing.

In an expedient further development of preferred embodiments of the invention, it is provided that the base covers the bottom in the interior of the housing. Thus, relatively large sealing surfaces are obtained between the base and the housing. For the same purpose, it is provided in another embodiment that, in the interior of the housing, the base covers an edge area of the interior wall of the housing which adjoins the bottom.

In a further development of preferred embodiments of the invention, it is provided that the opening of the bottom is provided with at least one surrounding annular groove which is filled by the material of the injected base. This results in the form-locking connection between the injected base and the housing while, in addition, the sealing surfaces are enlarged once again.

In a further development of preferred embodiments of the invention, it is provided that the base injected into the opening of the bottom of the housing is made in one piece with a cap framing the housing on the outside. By means of such a molded-on cap, the tightness can be improved further, on the one hand, while, on the other hand, the effective sensing surface of the housing of the thermostatic working element can be determined by dimensioning the axial length of the cap. In the case of an advantageous further development, it is provided that the cap is equipped with at least one receiving device for an additional element. Such an additional element may, for example, be a sealing ring or the like.

In a further development of preferred embodiments of the invention, it is provided that the area of the base facing the interior of the housing is provided with a sealing mass adjoining the interior wall of the housing and/or the outer surfaces of the supporting body. This sealing mass, which is a preferably adhesive plastic material which can be polymerized out, results in a further increase of the tightness by means of the additional sealing mass which has permanently elastic characteristics and which ensures the tightness also for an extended useful life of the thermostatic working element.

In a further development of preferred embodiments, the invention relates to a process for bringing an electric heating element into a housing of a thermostatic element which is characterized in that the heating element provided with the connecting lines is held in a core which embeds it and is introduced into the housing together with the core, in which case the core, the housing and a mold part are joined to form a casting mold into which a base made of plastic is injected which closes the recess of the bottom and surrounds the connecting lines.

In a further development of preferred embodiments of the invention, it is provided that, before the injection of the base, the walls of the housing and/or the surface of the heating element are provided with an adhesion promoting substance by spraying or otherwise applying the adhesive promoting substance. This adhesion promoting substance has the result that an adhesive connection is provided between the injected base and the walls of the housing and/or the supporting body of the heating element.

Other objects, advantages and novel features of the present invention will become apparent from the following detailed description of the invention when considered in conjunction with the accompanying drawings.

DETAILED DESCRIPTION OF THE DRAWINGS

Figure 1:
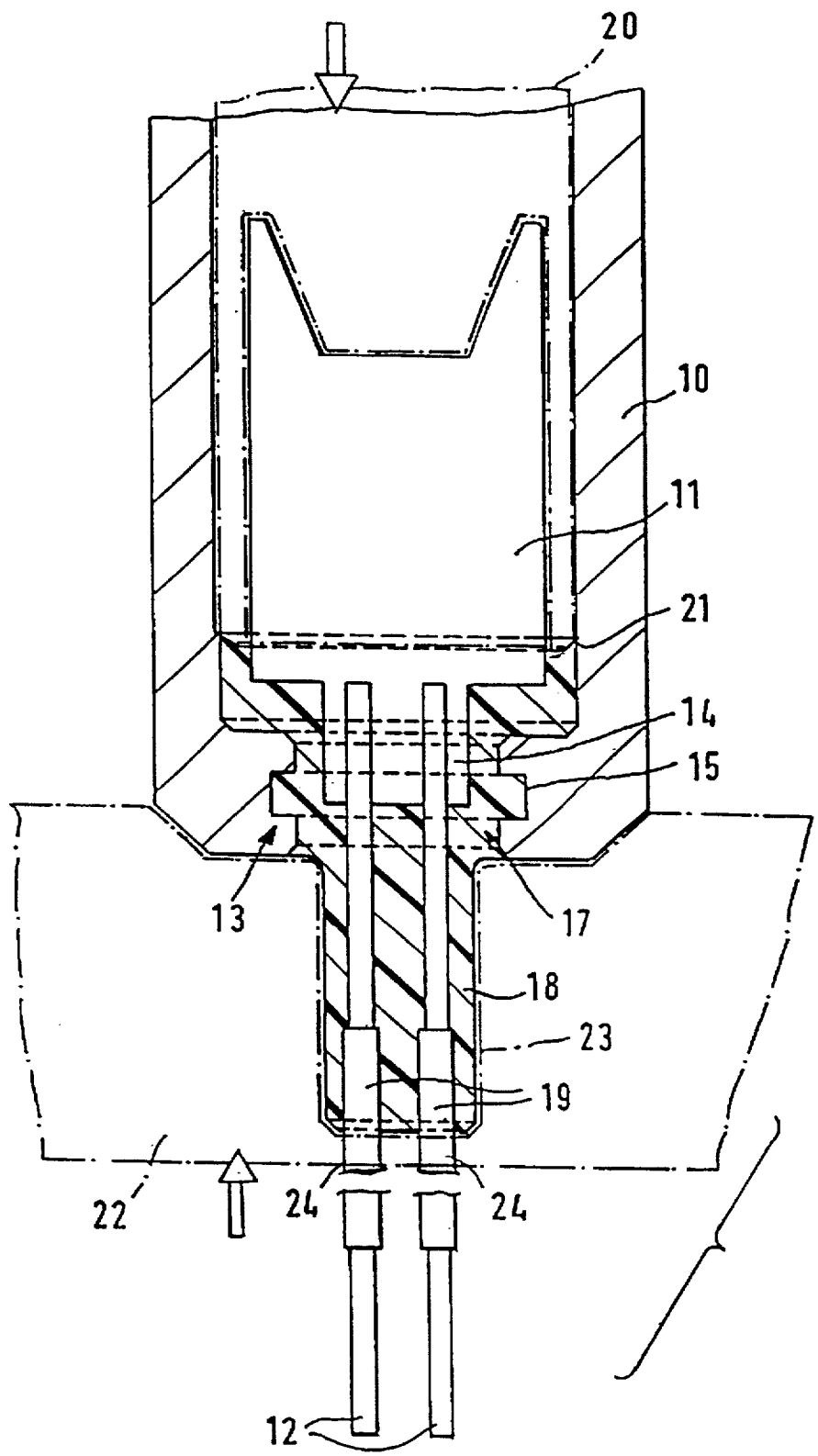
FIG. 1 is a partial sectional view of a housing of a thermostatic working element with a heating element and an injected base constructed according to a preferred embodiment of the invention, in which case the casting mold created for the injecting and supplemented by the housing is shown by a dash-dotted line.

The housing 10, which is enlarged approximately 20 times in the drawing, is made of metal. It has a pot-shaped design with a bottom and an open side which is not shown. The open side is normally closed by means of a guiding part for a working piston, in which case a bag-type membrane is provided between the guiding part and the housing, which membrane receives the working piston. Inside the housing, an expansion medium is arranged, particularly a wax mixture which, in a temperature range which can be defined by the mixture of the wax, changes its state of aggregation and drives out the working piston.

An electric heating element 11 is also arranged inside the housing which consists of a plate-shaped supporting body to which a meandering heating resistance in the form of a layer is applied which is not shown. Two connecting lines 12 are soldered to the heating resistance and are guided to the outside through an opening 13 of the bottom of the housing 10. The connecting lines 12 are soldered to the heating resistance in a stepped area 14 which has a smaller transverse dimension than opening 13 and which reaches into the opening 13 of the bottom of the housing 10. The opening 13 is also provided With a surrounding annular groove 15.

The opening 13 of the bottom of the housing 10 is closed by an injected base 17 made of plastic. This base 17 fills the annular groove 15 and covers the bottom and the lower edge area of the interior wall of the housing 10. In this case, injected base 17 also frames the lower edge of the supporting body 11 of the electric heating element and particularly the projection 14 which has the soldering points for the connecting lines 12. The base 17 has a projection 18 which projects out of the bottom of the housing 10 and surrounds the connecting lines 12 which, with a portion of their insulations 19, are also still surrounded by the base 17. The exterior ends of the connecting lines 12 are free of the insulation and are wired and galvanized.

In order to be able to produce the base 17, a casting mold is made which is partially formed of the housing 10. The supporting body 11 is fitted into a recess of a core 20 corresponding to the inside contour of the housing 10 such that supporting body 11 projects out of the core 20 by means of its lower edge area and the projection or stepped section 14 with the soldering points of the connecting lines 12. The core 20 is fitted into the housing 10 in which case it is sealingly supported on a collar 21 of the housing 10. A mold part 22 is assigned to the exterior side of the bottom of the housing 13 and provides a recess 23 for the projection 18. This mold part 22 preferably consists of two parts which are divided in the plane of the drawing and which are each provided with two half-shell-shaped recesses for leading out the connecting lines 12 provided with the insulations 19. Since the core 20 is supported on the collar 21, a sufficient closing force can be applied between the mold parts 22 and the core 20. In a manner which is not shown, the mold parts 22 contain the injection openings through which the injection of the plastic material which forms the base 17 takes place.

In order to hold the supporting body 11 with the heating resistance so tightly in the core 20 that, during the injection process, no plastic enters the area of the recess receiving the supporting body 11, it is expediently provided that the core 20 is provided with a tong-shaped clamping element. The tong-shaped clamping element consists of at least two halves which are provided with U-shaped recesses and which clamp the flap-shaped supporting body 11 between one another. The clamping of the clamping element takes place by means of conical surfaces.

Figure 2:
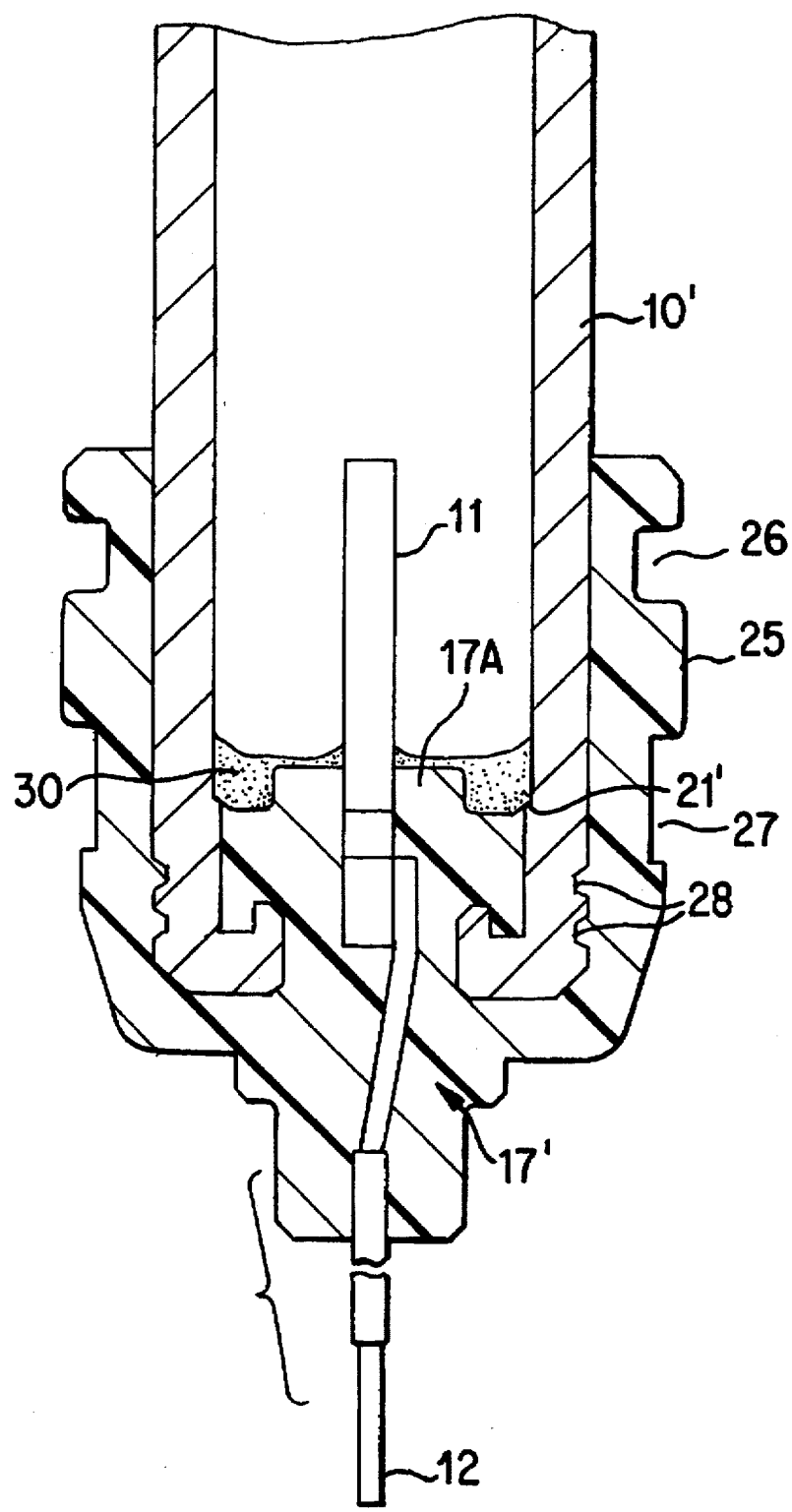
FIG. 2 is a partial sectional view of a housing of a thermostatic working element constructed according to another preferred embodiment of the invention and having a base which forms a flap framing the housing in its operating area.
Figure 3A:
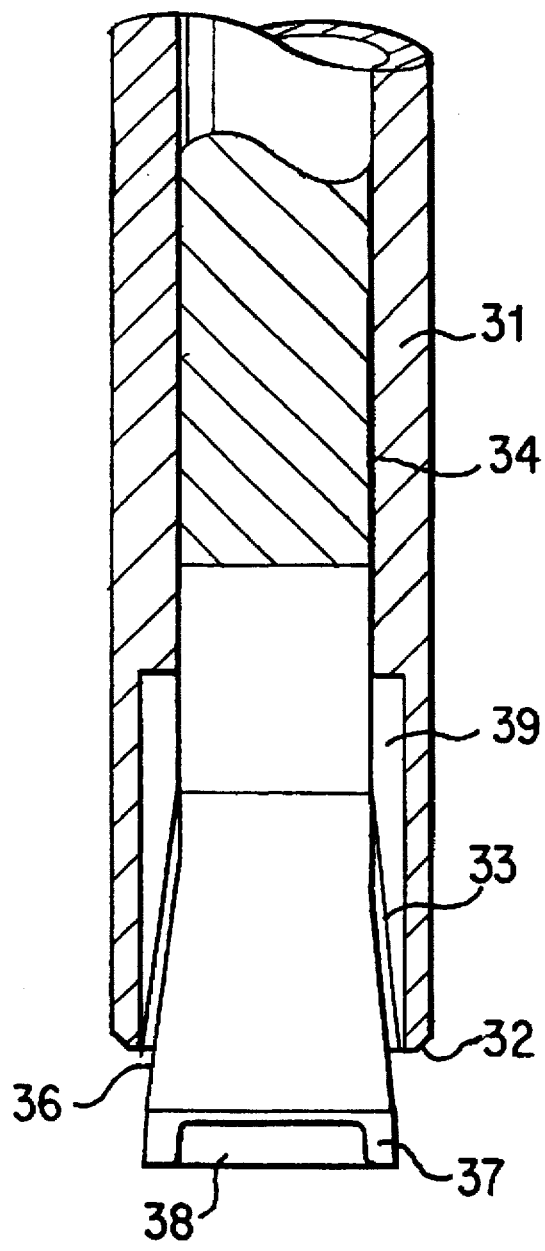
FIG. 3A is a partial sectional schematic view showing a clamping chuck with a tong-shaped clamping element for holding a supporting body of an electrical heating element during casting of preferred embodiments of the present invention.
Figure 3B:
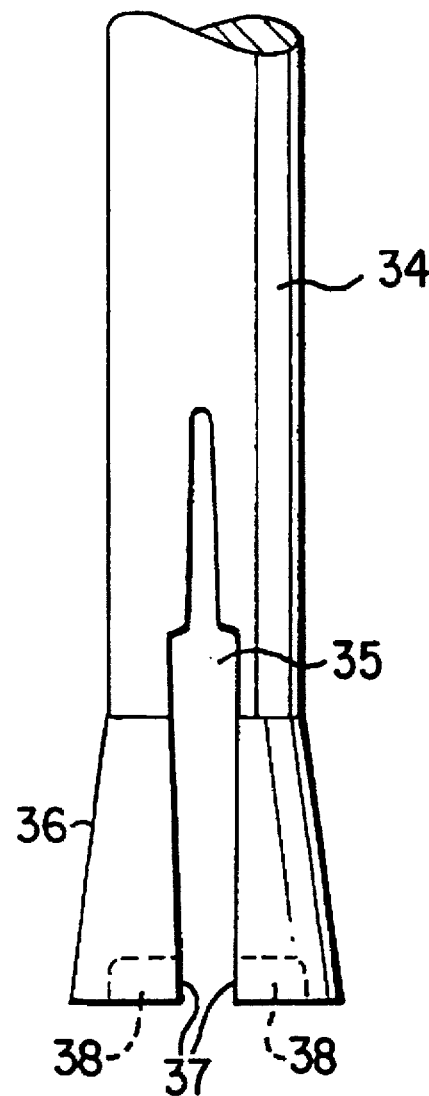
FIG. 3B is a side view of the clamping tongs of the clamping assembly of 3A.

FIGS. 3A and 3B depict a tong-shaped clamping element that can be used in holding the supporting body 11 during molding operations. This clamping assembly is generally similar to a conventional machine tool chucking assembly, with a special configuration to accommodate the shape of the supporting body 11 being held, and to accommodate the molding process described herein. The tong-shaped chucking element includes an outer shell part 31 which is insertable into the housing 10 to a position where its rim or edge 32 is abuttingly supported at the collar 21 on housing 10 in FIG. 1 or collar 21' in housing 10' in FIG. 2. The end section of outer shell 31 adjacent the edge 32 has an inner conical surface 33. Inside the housing 31 there is a shaft or rod 34 arranged which has an end region provided with an axial slot 35. The end of the shaft 34 is formed with a conical section 36 which essentially corresponds to the inside conical surface 33 of the housing 31. When the housing 31 and the shaft 34 are slid axially relative to one another, the cone shaped part 36 travels along the inner conical surface 33 of the housing 31 and elastically deforms the shaft 34 in the region of its slot 35 so that the edge surfaces 37 of the slot 35 press against and clamp the supporting body 11.

The edge surfaces 37 extend parallel with respect to one another and lie flat against the supporting body 11. In the connecting region, the slot 35 is slightly widened so that the surfaces 37 only engage on the supporting body 11. In the end region of the surfaces 37, cutouts 38 are provided which, during molding, result in provision of the protrusion 17A as shown in the FIG. 2 embodiment. The shell or housing 31 is further provided with a cutout 39 which surrounds the supporting body 11 in such a manner that during injection molding of the base 17', leakage of the molding material flow into the shell 31 is avoided or minimized. Subsequent to the casting operation, the tong-shaped clamping element can be removed by first axially displacing the housing 31 to loosen the grip of surfaces 37, and then pulling of the clamping element out of the housing 10'.

In the case of the embodiment according to FIG. 2, the base 17' injected into the bottom area of the housing 10' is provided with a cap 25 which is produced in one piece with it and which frames the housing 10' on the outside starting from the bottom area along a defined axial length. The cap is provided with receiving devices 26, 27 for auxiliary devices, for example, for sealing rings or the like. In the area of the cap 25, the housing 10' is provided with anchoring grooves 28.

Before the injection of the base, the walls of the lower area of the housing 10, 10' and preferably also the area of the supporting body 11 around which the molding of base 17 or 17' is to take place and the connecting wires 12 are provided with an adhesion-promoting substance which is suitable for an intimate connection between the plastic and the metal. Such an adhesion-promoting substance can also be applied by immersing, spraying, rolling or coating.

As illustrated in the embodiment according to FIG. 2, it is advantageous to bring a sealing mass 30 into the interior of the housing 10', which sealing mass 30 seals off the base 17' with respect to the interior walls of the housing 10' and additionally seals off the base 17' with respect to the supporting body 11 of the heating element. In such thermostatic working element, pressures may occur above 100 bar. In addition, the usage range of such a thermostatic working element is between −40° C. and +150° C., particularly when it is used in conjunction with a thermostatic valve of a cooling system of an internal-combustion engine of a motor vehicle. This sealing mass 30, which is entered in a liquid or viscous form, preferably consists of a plastic material which can be polymerized out and which is also entered as a two-constituent mass. It is advantageous for this plastic material, such as silicone, to have permanent elastic characteristics and to establish an adhesive connection with the plastic material of the base 17' as well as to the metal of the housing 10' as well as to the supporting body 11 which consists of ceramic material or another electrically non-conducting, heat-resistant material.

It is also contemplated by the invention to arrange other electric heating elements in a corresponding manner and hold the same by means of an injection-molded-on base, for example, pill-shaped PTC-heating elements.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Process of making a thermostatic working element of the type having a housing for receiving an expansion medium in which an electric heating element is arranged which is provided with connecting lines, said housing including a bottom opening, said process comprising:

inserting the heating element provided with the connecting lines and bounded by a first molding core part into the housing with the connecting lines protruding through the bottom opening of the housing, locating a second molding core part adjacent said housing so as to surround the bottom opening and form a casting mold together with the first molding core and the housing, and injecting plastic into the molding core to form a plastic base closing said bottom opening and surrounding the connecting lines.

2. Process according to claim 1, wherein said heating element includes a supporting body to which the connecting lines are connected, surface portions of said supporting body forming part of said casting mold.

3. Process according to claim 2, wherein surfaces of at least one of the housing and the supporting body which are to be contacted by the injected plastic base are coated with an adhesion promoting substance before said step of injecting plastic.

4. Process according to claim 2, comprising providing said first molding core part with tong shaped clamping means which are clamped around edge areas of the supporting body during said injecting step.

5. Process according to claim 3, comprising providing said first molding core part with tong shaped clamping means which are clamped around edge areas of the supporting body during said injecting step.

* * * * *